United States Patent
Brasseur

(10) Patent No.: US 7,736,601 B2
(45) Date of Patent: Jun. 15, 2010

(54) APPARATUS FOR CATALYTIC CLEANING OF WASTE GASES

(75) Inventor: Ing. Olivier Brasseur, Ratingen (DE)

(73) Assignee: BD Heat Recovery Inc., Seminole, FL (US)

( * ) Notice: Subject to any disclaimer, the term of this patent is extended or adjusted under 35 U.S.C. 154(b) by 1011 days.

(21) Appl. No.: 11/330,391

(22) Filed: Jan. 11, 2006

(65) Prior Publication Data

US 2006/0286010 A1 Dec. 21, 2006

(30) Foreign Application Priority Data

Jun. 17, 2005 (EP) .................................. 05013078

(51) Int. Cl.
*F01N 3/10* (2006.01)
*B01D 50/00* (2006.01)

(52) U.S. Cl. ...................................... 422/173; 422/177

(58) Field of Classification Search .............. 422/168, 422/177, 180, 175, 171; 423/235; 165/165, 165/166

See application file for complete search history.

(56) References Cited

U.S. PATENT DOCUMENTS 5,271,459 A * 12/1993 Daschmann ............... 165/166
5,814,284 A * 9/1998 Schluter .................... 422/175
7,090,810 B2 * 8/2006 Sun et al. .................. 423/235

FOREIGN PATENT DOCUMENTS

| EP | 0 364 617 | 10/1988 |
| EP | 0 548 604 | 12/1992 |

\* cited by examiner

*Primary Examiner*—Tom Duong
(74) *Attorney, Agent, or Firm*—Harness, Dickey & Pierce, P.L.C.

(57) ABSTRACT

The present invention relates to an apparatus for catalytic cleaning, particularly de-nitrification, of waste gases, said apparatus comprising a heat exchanger (12) for exchanging heat between the already cleaned gas and the raw gas to be cleaned, a heating channel (14), in which additional heat is supplied to the raw gas and which joins the heat exchanger (12), a jetting unit is provided in the heating channel (14) for supplying ammonia and an arrangement of catalysts (16) containing catalysts, which is attached to the heating channel (14) and is placed above the heat exchanger (12), wherein the arrangement of catalysts (16) and the heating channel (14) are connected with each other via an essentially U-shaped deflection hood (24) and the heat exchanger is one of type working in counter flow.

10 Claims, 3 Drawing Sheets

APPARATUS FOR CATALYTIC CLEANING OF WASTE GASES

FIELD OF THE INVENTION

The present invention relates to an apparatus for catalytic cleaning of waste gases, particularly for de-nitrification of flue gases.

BACKGROUND OF THE INVENTION

A common embodiment of such an apparatus for catalytic cleaning of waste gases consists of a regenerative heat exchanger, a heating unit, an ammonia supply unit and catalysts, through which the raw gas is directed in sequence after having left the power station. The cleaned gas leaving the catalysts is routed again through the heat exchanger and finally escapes from the apparatus. Stated more precisely, the raw gas to be cleaned is first preheated in the regenerative heat exchanger, whose heat transferring surfaces are heated up by the cleaned gas coming out from the catalysts and is subsequently conducted to the heating unit, in which it is heated to the operating temperature of the catalysts. Ammonia is added to the raw gas via the ammonia supply unit, after it has passed through the heating unit and then, after a thorough mixing, the gas reaches the catalysts, where it is de-nitrified. The cleaned gas, leaving the catalysts, is then conducted through the regenerative heat exchanger, thereby heating up the heat transferring surfaces, and finally leaves the apparatus.

It is always desirable to advantageously modify a common apparatus.

It is therefore an object of the present invention to provide an apparatus for catalytic cleaning of waste gases, which has a smaller overall size in comparison to the conventional ones and which requires a lesser amount of external energy for its operation.

This object is fulfilled through an apparatus for catalytic cleaning of waste gases according to the present invention.

SUMMARY OF THE INVENTION

The invention provides for an apparatus for catalytic cleaning, particularly de-nitrification of waste gases, said apparatus comprising a heat exchanger for exchange of heat between the already cleaned gas and the raw gas to be cleaned, a heating channel, in which additional heat is supplied to the raw gas, joining the heat exchanger, a jetting unit, which is provided in the heating channel for supplying ammonia and an arrangement of catalysts, containing catalysts, which joins the heating channel and is placed above the heat exchanger, wherein the arrangement of catalysts and the heating channel are connected with each other via an essentially U-shaped deflection hood, characterized in that the heat exchanger is a heat exchanger, working in counter flow.

DETAILED DESCRIPTION OF THE INVENTION

Figure 1:
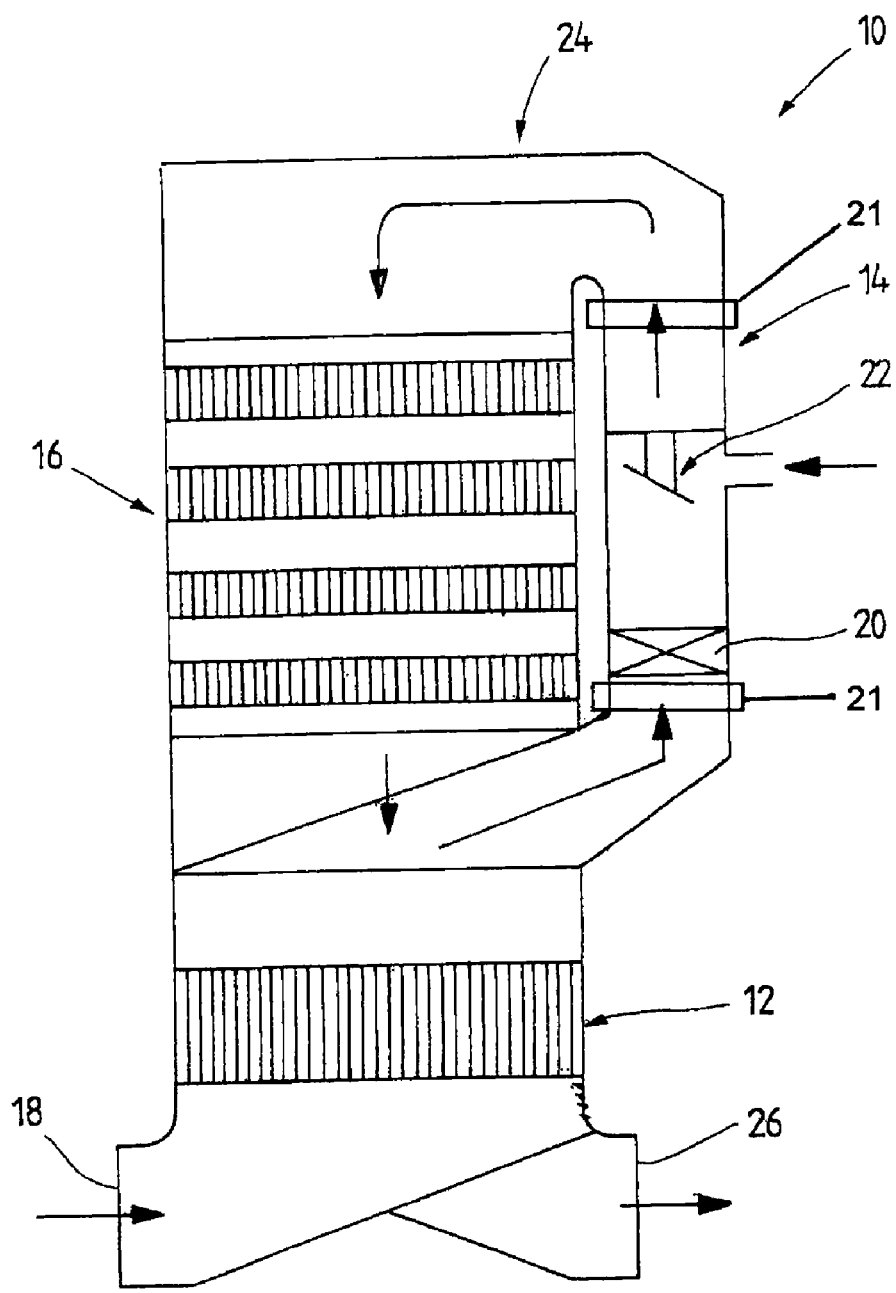
FIG. 1: A schematic side view of an embodiment of the apparatus as per the invention.

The apparatus as per the present invention consists of a heat exchanger, working in counter flow, for exchanging heat between the already cleaned gas and the raw gas to be cleaned. The heating surfaces of the heat exchanger are also heated here by the cleaned gas leaving the catalysts, so that heat can be delivered to the raw gas to be cleaned. As per the invention, the working of the heat exchanger takes place in counter flow. It means that the heat exchanger is so constructed that inside the heat exchanger and at the time of transfer of heat, the raw gas to be cleaned and the already cleaned gas move in opposite direction to each other. A heating channel joins the heat exchanger and inside the channel, additional heat is supplied to the raw gas to bring it up to the operating temperature of the catalysts. A jetting unit for supplying ammonia is further provided in the heating channel to add ammonia to the raw gas to be cleaned. A U-shaped deflection hood is attached to the end of the heating channel, by means of which the raw gas to be cleaned is deflected towards the catalyst arrangement, which, in flow direction, is placed behind the deflection hood. The cleaned gas, leaving the arrangement of catalysts, again flows through the heat exchanger, where it warms up the raw gas in counter flow by heating the heat exchanger surfaces.

An advantage of the apparatus for catalytic cleaning of power plant flue gases as per the invention over the conventional apparatus lies in that a heat exchanger is used, which works in counter flow. Such heat exchangers, working in counter flow, can be designed in constructionally simple and hence in an inexpensive manner. Moreover, they require a small overall size and have a higher level of performance. Accordingly, the apparatus as per the invention can turn out to be smaller. Moreover, lesser amount of external energy is required to be supplied to the heating channel to bring the raw gas to be cleaned up to the operative temperature of the catalysts.

The heating unit, which is provided in the heating channel, is preferably a steam heated gas pre-heater, a gas burner or a device for merging hot gases.

Further, it is preferred that, for the addition of ammonia, a suitable jetting unit is provided, which is placed behind the heating unit in the heating channel, in the flow direction of the raw gas.

A mixing unit for thorough mixing of the flue gas with the supplied ammonia is advantageously provided in the heating channel. This mixing unit is preferably provided as at least one flow assembly in the form of a vortex surface or the like, which is placed behind the jetting unit in the direction of the flow.

The deflection hood preferably comprises a flow cross section, which basically corresponds to the cross section of the catalysts, which are provided in the arrangement of catalysts, so that a pressure loss is avoided.

Further, in the deflection hood, at least one flow assembly is arranged in the form of a vortex surface to develop a more uniform flow profile of the raw gas to be cleaned. It is ensured through these measures that a stream of raw gas enters the arrangement of catalysts with an even flow profile, through which the de-nitrification process is improved.

The heating channel is further attached to the deflection hood and to the heat exchanger via compensators 21 to compensate for the thermal delay.

As far as the heat exchanger working in counter flow is concerned, a plate heat exchanger is preferred, which contains embossed individual plates. These plates being connected with each other in order to provide plate pairs with flow channels for one medium defined between the plates of each plate pair. These plate pairs on their part are joined together to form a stack of plates defining a flow channel for another medium between each plate pair of the stack, wherein the cross section of each inflow and outflow channel are displaced diagonally to each other in the main flow direction and the in and outflow cross sections of the channels for the two media are arranged next to each other. These are, however, displaced with respect to each other by half the height of the in- or outflow cross sections of the channels, wherein several plate stacks of similar type are placed immediately next to each other. The in- and outflow cross sections of every plate stack being separated from each other by one middle wall, which runs along the entire stack length. The middle walls of the adjacent plate stacks are connected by a roof wall to form a common main collector and these main collectors are connected, alternately and including the in- and outflow cross sections of the two end plate stacks, with a common inflow- or outflow union for one of the two media.

The inflow union and the outflow union for every medium is placed respectively at the other end of the adjacent plate stacks The roof walls of the main collectors of the plate heat exchangers are preferably built in a slanted fashion.

In the following, one embodiment of the present invention is described in more detail with reference to the accompanying drawings.

The apparatus 10, shown in the drawing, is used for de-nitrification of waste gases, which is subsequently referred to as raw gas. The apparatus 10 includes a heat exchanger 12, which operates in counter flow, for heating up of the raw gas, a heating channel 14, in which the raw gas is further heated, and an arrangement of catalysts 16 for de-nitrification of the raw gas. The raw gas to be cleaned enters the apparatus 10 through an entry opening 18 and flows through the heat exchanger 12, whereby it is warmed by the heat, which is conveyed to the heat exchanger by the cleaned gas leaving the arrangement of the catalysts 16. The cleaned gas leaving the catalysts 16 flows through the heat exchanger 12 from top to bottom, that is vertically downwards, thereby heating the heating surfaces of the heat exchanger 12, whereas the raw gas to be cleaned is conducted through the heat exchanger 12 from bottom to top, that is vertically upwards. Inside the heat exchanger 12, the cleaned gas and the raw gas are conducted in such a manner that they always flow in opposite direction to each other, which is described as 'operating in counter flow' and is explained later in greater detail with reference to FIG. 3. The heated raw gas, after it leaves the heat exchanger 12, is conducted through the heating channel 14, where it is further heated up by a heating unit 20, which is not shown in detail here, to an operating temperature, necessary for working of the arrangement of catalysts 16. The heating unit 20 can be, for example, a steam heated gas pre-heater, which has the advantage that no further waste gases are created, whereby the quality of de-nitrification is improved. Alternatively, the heating unit 20 can also be a gas burner or a unit for merging hot gases.

The raw gas, leaving the heating unit 20, further flows upwards through the heating channel 14 and meets a mixing unit 22, which is schematically shown in the drawing as a vortex surface. Vortexes or turbulences are generated in the raw gas by the mixing unit 22. Ammonia is introduced through a jetting unit (not shown in detail) in the direction of the mixing unit 22, which is swirled also at the vortex surface and is suitably mixed with the raw gas. The mixing unit 22 basically serves the purpose of ensuring a thorough mixing of the raw gas and ammonia. This raw gas—ammonia mixture flows further upwards from the mixing unit 22 and at the upper end of the apparatus 10, it is deflected downwards in the direction of the arrangement of catalysts 16 by a U-shaped deflection hood 24. The deflection hood 24 thereby assumes a cross section of flow, which corresponds to the cross section of the catalysts, which are provided in the arrangement of catalysts 16, so that no pressure loss results in the deflection hood 24. The deflection hood 24 may also contain flow assemblies, which can be provided, for example, in the form of vortex surfaces; these are, however, not shown in detail in the drawing. By providing flow assemblies in the deflection hood 24, the flow profile of the raw gas-ammonia mixture can be regulated uniformly before the mixture enters the arrangement of catalysts 16.

In the arrangement of catalysts 16, the raw gas is finally de-nitrified and leaves as cleaned gas in vertically downward direction. The cleaned gas then flows through the heat exchanger 12 from top to bottom, thereby heating up its heating surfaces. These surfaces on their part transfer the heat to the raw gas flowing from bottom to top through the heat exchanger 12. The cleaned gas finally leaves the apparatus 10 through an exit opening 26 after flowing through the heat exchanger 12 in vertically downward direction.

In comparison to the known types of apparatus, the main advantages of the inventive apparatus 10 for catalytic cleaning of waste gases, described above, lie firstly in the small overall space required for construction of the apparatus 10, and reduced external energy required to be added to the heating unit 20, due to the excellent efficiency of the heat exchanger 12 operating in counter flow, and also with regard to the overall simple constructional features of the apparatus 10.

Figure 2:
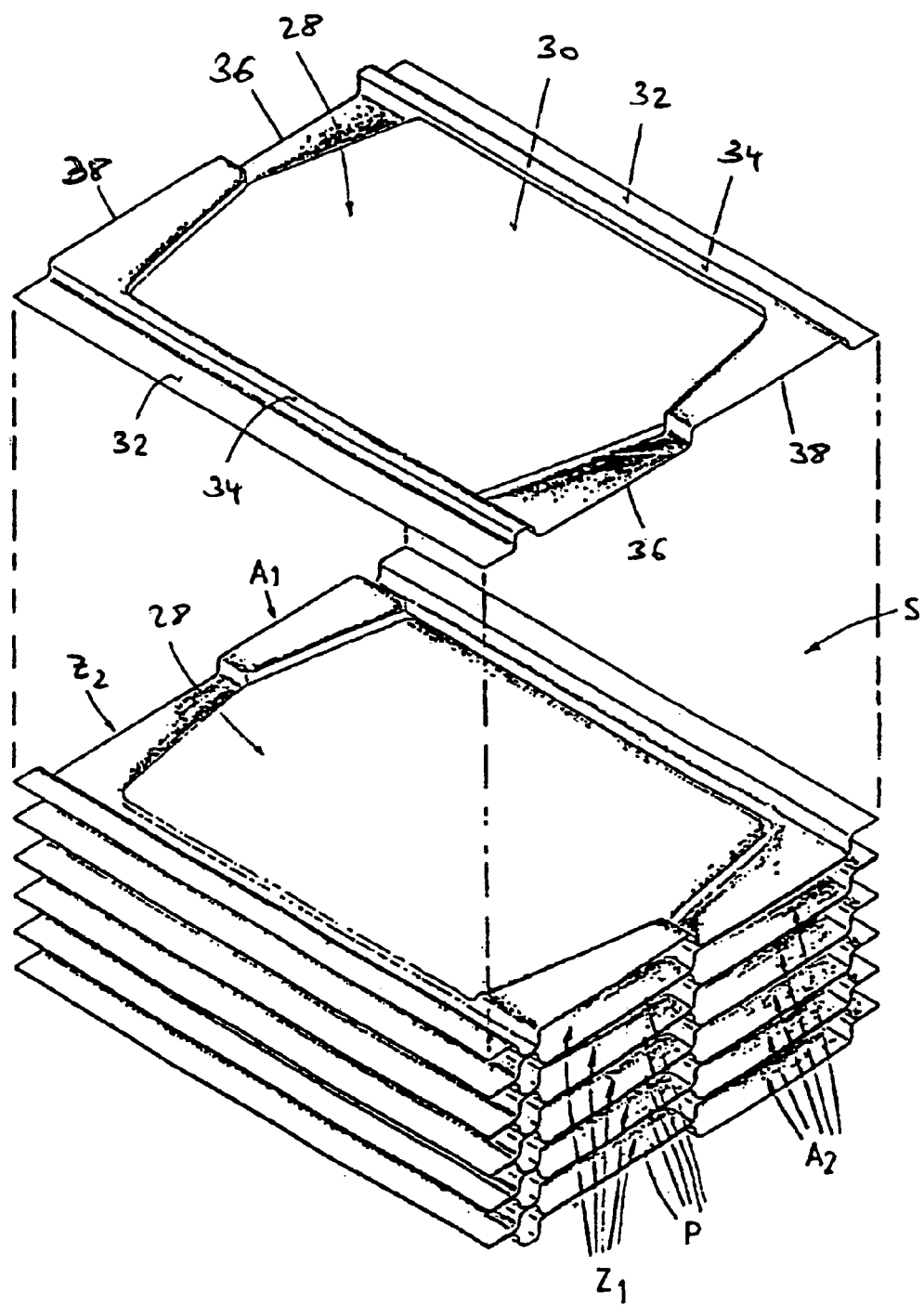
FIG. 2: A perspective view of a part of a plate stack, made up of several plates, of an embodiment of a heat exchanger, which operates in counter flow.

FIG. 2 shows a perspective view of a part of a plate stack S, made of several individual plates 28, of an embodiment of a heat exchanger 12, operating in counter flow. This heat exchanger is used in the apparatus 10 shown in FIG. 1. The stack of plates S contains a number of individual plates 28, which are connected with each other respectively to form a plate pair P.

Each individual plate 28 has a base 30, which lies in a different plane than the longitudinal edges 32. In contact with and parallel to these longitudinal edges 32, each individual plate 28 is formed with a bearing surface 34, which is displaced in height with respect to the longitudinal edges 32. The displacement between the bearing surface 34 and the associated longitudinal edge 32 is double as high as the displacement between the longitudinal edges 32 and the base 30. The base 30 therefore lies height wise in the middle of the plane of the longitudinal edges 32 and that of the bearing surfaces 34.

In an embodiment, the edges, running across the longitudinal edges 32 of the individual plate 28, lie in the plane halfway between the plane of the longitudinal edges 32 or the plane of the bearing surfaces 34. Cross edges 36 and 38 are thus generated, which, along the height, that is, vertically towards the surface of the base 30, are displaced with respect to each other by the same amount as are the planes, in which lie, on one side the longitudinal edges 32 and on the other, the bearing surfaces 34. It can be clearly made out from FIG. 2 that the cross edges 36 lie diagonally opposite to each other, as are the cross edges 38.

As shown in the upper part of FIG. 2, two of the individual plates 28 are joined to form a plate pair P, as is evident from the lower part of the diagram. Five complete plate pairs P are shown in FIG. 2; on the topmost plate pair P, an individual plate 28 is placed, which is joined with the spaced apart plate 28 to form another plate pair P.

When the plate pairs P are joined together in the region of the laying surfaces 34 to produce plate stack S, channels, lying on top of one another, are formed for two media, which take part in heat exchange, that is, for the raw gas and the cleaned gas. While the one medium flows through the flow channels, which are built up through the respective plate pairs P, the other medium flows through the flow channels, which are defined respectively between two plates forming a plate pair P of the plate stack S. The cross edges 36 of the individual plates 28, lying in the plane of the longitudinal edges 32, form the inflow cross section Z 1 or, as the case may be, the outflow cross section A 1 of the flow channels for the medium, flowing between the plate pairs P. The cross edges 38 of the individual plates 28, lying in the plane of the laying surfaces 34, form the inflow cross section Z 2 or, as the case may be, the outflow cross section A 2 for the other medium, which flows between the individual plates 28 of each plate pair P in opposite direction to that of the first medium.

Figure 3:
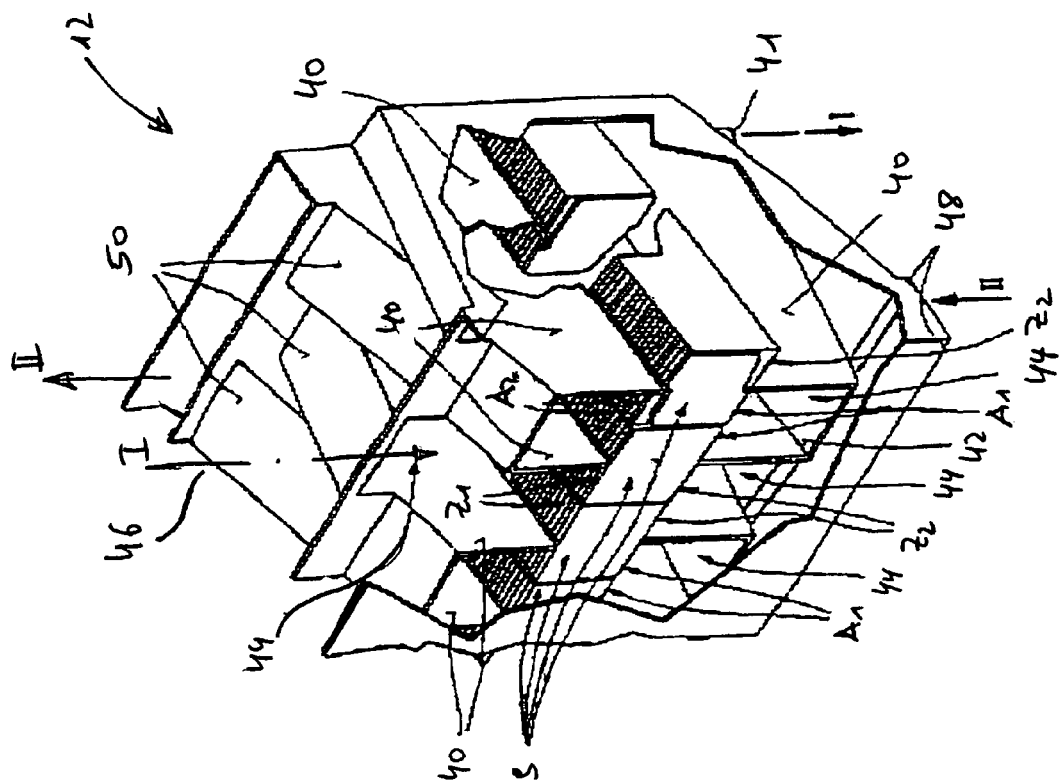
FIG. 3: A perspective view of an embodiment of a heat exchanger, operating in counter flow, which finds use in the apparatus, as shown in FIG. 1.

In FIG. 3, a perspective view of an embodiment of a heat exchanger 12, operating in counter flow, is shown. The heat exchanger finds application in the apparatus 10, as shown in FIG. 1. Warm, already cleaned gas, denoted by I, flows from top to bottom through the plate heat exchanger 12, whereas the raw gas, denoted by II, which is to be cleaned and to be heated, is conducted from bottom to top through the heat exchanger 12. The exchange of heat between both the media I and II takes place in the stack of plates S, which, as shown in FIG. 2, is made up of individual plates 28, which are combined to form plate pairs P. These plate stacks S are arranged next to each other in such a way that their inflow cross sections Z 1 and Z 2 are placed on opposite sides diagonally to each other. This applies for the outflow cross sections A 1 and A 2.

Each inflow channel Z 1 and outflow channel A 2 as well as each inflow channel Z 2 and outflow channel A 1 are separated from each other by a middle wall 40, which runs over the entire length of the plate stack S. The plate stacks S adjacent to the middle walls 40, are connected through a roof wall 42 to form a common main collector 44.

These main collectors 44 thus represent a supply or, as the case may be, a removal of the cleaned gas or the raw gas for two plate stacks S, which are at any time adjacent to each other.

The warm, already cleaned gas I is supplied from top along the chain-dot arrow, as shown in FIG. 3, to the plate heat exchanger 12, which is constructed as a reverse flow heat exchanger. This may be done even through an inflow union, which is not shown in detail. This inflow union is connected with those main collectors 44, which join above the inflow cross sections Z 1 of the plate stack S. While flowing through the adjacent plate stacks S respectively, the stream of the cleaned gas gets divided and arrives at the main collectors 44, which are built under the plate stack S and these main collectors lead the cleaned gas to the outflow union 41, which, as per the embodiment as in FIG. 3, is placed below the inflow union.

As it receives heat, the raw gas II enters from bottom in the inflow union 48 and arrives from here at the main collectors 44, which lead to the inflow cross sections Z 2 of the plate stacks S. Also the sub streams of the raw gas II are divided in the plate stack S and arrive at the main collectors 44, which in turn lead to an outflow union 50, which is built vertically above the inflow union 48. To avoid dead space zones and undesirable eddies inside the plate heat exchanger 12, the roof walls 42 of the main collectors 44 are made in a slanted fashion, as is shown clearly in the upper part of the FIG. 3.

The illustration of the plate heat exchanger 12 in FIG. 3 makes it clear that, in spite of a very compact and space saving method of construction, a good accessibility to the stacks of plate S is available, which not only makes it easy to install cleaning devices, which would eventually be required, but also provides for a good access for repair and maintenance. Besides, guiding of flow of both the media I and II takes place over the shortest routes and without any deflection to cause a pressure loss. This results in that the described plate heat exchanger has a high efficiency in spite of its compactness.

It should be made clear that the embodiment, as described above, is not restrictive in nature; modifications and changes can be carried out without compromising the scope of protection of the present invention, as is defined in the enclosed Claims.

What is claimed is:

1. Apparatus for catalytic cleaning, particularly de-nitrification of waste gases, said apparatus comprising a heat exchanger for exchanging heat between the already cleaned gas and the raw gas to be cleaned, a heating channel for supplying additional heat to the raw gas, a jetting unit provided in the heating channel for supplying ammonia and an arrangement of catalysts containing catalysts, which is attached to the heating channel and is placed above the heat exchanger, said arrangement of catalysts and said heating channel being connected with each other via an essentially U-shaped deflection hood, and wherein the heat exchanger is a heat exchanger working in counter flow, wherein the heating channel is attached to the deflection hood and the heat exchanger via compensators to compensate for thermal delay, wherein at least one mixing unit is provided in the heating channel for mixing of the flue gas with the supplied ammonia, wherein the mixing unit is at least one flow assembly in the share of a vortex surface, and wherein at least one flow assembly in the form of a vortex surface is provided in the deflection hood for developing a uniform flow profile of the flue gas.

2. Apparatus according to claim 1, wherein at least one heating unit is placed in the heating channel.

3. Apparatus according to claim 2, wherein the heating unit is a steam heated gas pre-heater, a gas burner or a device for merging hot gases.

4. Apparatus according to claim 2 wherein the jetting unit is placed behind the heating unit in the direction of the flow.

5. Apparatus according to claim 1, wherein the mixing unit is placed behind the jetting unit in the direction of the flow.

6. Apparatus according to claim 1 wherein the deflection hood comprises a flow cross section, which essentially corresponds to the cross section of the catalysts, provided in the arrangement of catalysts.

7. Apparatus according to claim 1 wherein the heat exchanger is a plate heat exchanger containing embossed individual plates which are connected to each other to form plate pairs as a flow channel for the one medium, said plate pairs being joined together to form a plate stack and form between themselves a flow channel for the other medium respectively, wherein the inflow- and outflow cross sections of each flow channel are diagonally displaced with respect to each other in the main flow direction and the inflow- and outflow cross sections of the channels for both the media are arranged next to each other yet being displaced with respect to each other at half the height of the inflow- and outflow cross sections respectively of the channels, whereby several of a similar type of plate stack are arranged immediately next to each other, the inflow- and outflow cross sections of each plate stack being separated from each other through a middle wall which runs along the entire length of the plate stack, the middle walls of the adjacent plate stacks respectively being connected to a common main collector by a roof wall and said main collectors and the inflow- and outflow cross sections of both the end plate stacks being connected to a common inflow- and outflow union for one of the two media respectively.

8. Apparatus according to claim 7, wherein the inflow union and the outflow union for each medium is placed at the other end of the adjacent plate stacks.

9. Apparatus according to claim 7, wherein the roof walls of the main collectors are slanted.

10. Apparatus for cleaning waste gases, said apparatus comprising:
   a heat exchanger for exchanging heat between cleaned gas and raw gas to be cleaned;
   a heating channel for supplying additional heat to the raw gas;
   a jetting unit provided in the heating channel and above the heat exchanger for supplying ammonia to raw gas in the heating channel;
   a mixing device for mixing the ammonia and raw gas in the heating channel, the mixing device includes at least one flow assembly in the shape of a vortex surface;
   an arrangement of catalysts;
   an essentially U-shaped deflection hood connecting an upper end of the heating channel for deflecting gas therein downwardly into the arrangement of catalysts the deflection hood includes at least one flow assembly in the form of a vortex surface for developing a uniform flow profile of the gas therein;
   compensators for compensating for thermal delay, the heating channel being attached to the deflection hood and heat exchanger via the compensators; and
   a lower end of the arrangement of catalyst being connected to the heat exchanger so that cleaned air moves downwardly through the heat exchanger while raw gas flows upwardly through the heat exchanger in a counter flow.

* * * * *